(12) United States Patent  (10) Patent No.: US 9,379,755 B2
Froger et al.  (45) Date of Patent: Jun. 28, 2016

(54) SCORED SMART CARD

(71) Applicants: Alexis Froger, Meudon (FR); Jeremy Renouard, Meudon (FR); Georges Cogno, Meudon (FR)

(72) Inventors: Alexis Froger, Meudon (FR); Jeremy Renouard, Meudon (FR); Georges Cogno, Meudon (FR)

(73) Assignee: GEMALTO SA, Meudon (FR)

( * ) Notice: Subject to any disclaimer, the term of this patent is extended or adjusted under 35 U.S.C. 154(b) by 27 days.

(21) Appl. No.: 14/355,380

(22) PCT Filed: Oct. 29, 2012

(86) PCT No.: PCT/EP2012/071369
§ 371 (c)(1),
(2) Date: Apr. 30, 2014

(87) PCT Pub. No.: WO2013/064454
PCT Pub. Date: May 10, 2013

(65) Prior Publication Data
US 2014/0308990 A1  Oct. 16, 2014

(30) Foreign Application Priority Data
Oct. 31, 2011 (EP) ..................................... 11306406

(51) Int. Cl.
*H04B 1/3816* (2015.01)
*G06K 19/077* (2006.01)

(52) U.S. Cl.
CPC ........ *H04B 1/3816* (2013.01); *G06K 19/07739* (2013.01)

(58) Field of Classification Search
CPC .................... H04B 1/3816; G06K 19/07739
See application file for complete search history.

(56) References Cited

U.S. PATENT DOCUMENTS

| 5,581,065 A * | 12/1996 | Nishikawa | G06K 19/072 235/487 |
| 6,604,685 B1 * | 8/2003 | Norton | G06K 7/1097 235/492 |
| 6,685,097 B1 * | 2/2004 | Housse | G06K 19/077 235/487 |
| 7,086,601 B2 | 8/2006 | Dhers et al. | |
| 2007/0108298 A1 * | 5/2007 | Kalck | G06K 19/07718 235/492 |

(Continued)

FOREIGN PATENT DOCUMENTS

EP  0955604 A1  11/1999
EP  1626366 A1  2/2006

OTHER PUBLICATIONS

PCT/EP2012/071369, International Search Report, Dec. 18, 2012, European Patent Office, P.B. 5818 Patentlaan 2 NL—2280 HV Rijswijk.

(Continued)

*Primary Examiner* — Cindy Trandai
(74) *Attorney, Agent, or Firm* — The Jansson Firm; Pehr B. Jansson

(57) ABSTRACT

The invention relates to a SIM (2) card in a first format, with an electronic module (4). The card body comprises a score line (6) surrounding the electronic module (4) in order to define the second card format (3). The said score line (6), comprises residual matter thickness that is smaller than the thickness of the card body. The thickness of the residual matter comprises a first thickness (9) over a first part of the score line (6), at least one second thickness (10) smaller than the first thickness (9) over a second part of the score line and at least one residual thickness change zone (11, 17), where the said thickness change zone is a gradual thickness change zone (11, 17) that goes from the first thickness to the second thickness.

5 Claims, 4 Drawing Sheets

(56) References Cited

U.S. PATENT DOCUMENTS

| | | | |
|---|---|---|---|
| 2007/0213096 A1* | 9/2007 | Bella | G06K 19/0723 455/558 |
| 2009/0145971 A1* | 6/2009 | Yin | G06K 19/0716 235/492 |
| 2010/0025480 A1* | 2/2010 | Nishizawa | G06K 19/077 235/492 |
| 2010/0090805 A1* | 4/2010 | Libotte | G06K 19/0719 340/10.2 |
| 2013/0201646 A1* | 8/2013 | Braun | H05K 5/0282 361/784 |
| 2013/0270349 A1* | 10/2013 | Lepp | G06K 19/0719 235/492 |

OTHER PUBLICATIONS

PCT/EP2012/071369, Written Opinion of the International Searching Authority, Dec. 18, 2012, European Patent Office, P.B. 5818 Patentlaan 2 NL—2280 HV Rijswijk.

* cited by examiner

SCORED SMART CARD

BACKGROUND

The invention relates to a scored smart card and particularly the profile of the score.

SIM (Subscriber Identity Module), cards, also called UICC (Universal Integrated Circuit Card) cards, are smart cards defined by the standard ETSI TS 102 221 of the European Telecommunications Institute. The ETSI has defined three SIM card formats. The first format is identified by the ETSI as the ID-1 UICC format, the format commonly called 'credit card' format, which is also defined in the standard ISO 7816-1. The second format is identified by the ETSI as the Plug-in UICC format, the most common format today with a card size of 25 mm by 15 mm, also called the second-generation format or 2FF format. The third format is identified by the ETSI as the Mini UICC format, the recently introduced format with a card size of 15 mm by 12 mm, also called the third-generation or 3FF format.

Smart card manufacturers are used to making a card body in the ID-1 UICC format in which card body formats of the Plug-in UICC and Mini-UICC sizes are placed, nested with one another and separated by scored zones. Scored zones may be achieved by a separating score line between the card bodies, which are joined to each other by tabs or by a so-called perimeter score.

The separating score line is commonly used because it makes it possible to hold the cards together well, while making it easy to separate them, breaking off one tab after another. However, this technique has one drawback, due to the score line, if it is used between the 2FF and the 3FF format. That is because some connectors receive the card by sliding, and have very thin contact pads that get stuck in the score line, thus damaging the connector and making the telephone unusable.

The perimeter score is a score made by reducing the thickness of the entire perimeter of the card body, leaving residual thickness that is smaller than the thickness of the card. The thickness of the card is 800 µm, so such a score leaves a residual thickness of a few hundred µm. This type of score remedies the problem presented above by the separating score line between the formats 2FF and 3FF. However, the perimeter score has the drawback of either being difficult to detach when the thickness of the residual matter left by the score is too great or being liable to be detached unintentionally when the residual thickness is too small. Additionally, in order to ensure high manufacturing efficiency, a card must be made which is compatible with the injection moulding method.

SUMMARY

The invention is aimed at offering a new solution to remedy the problems described above. On a smart card with a card body in the first card format and an electronic module, the card body comprises a score line surrounding the electronic module which defines a second card format, wherein the residual thickness of matter of the score line is smaller than that of the card body. The invention is characterised by a residual matter thickness which comprises a first thickness on a first part of the score line, at least a second thickness smaller than the first thickness on a second part of the score line and at least one residual thickness change zone. The said thickness change zone is a gradual thickness change zone from the first thickness to the second one.

The use of the first thickness makes it possible to hold the card on the first part and avoid the unintentional detachment of the card in the second format. The use of a second, smaller thickness makes it possible to have a part that is easy to detach to start detachment. The use of the gradual thickness change zone makes it easier to make the mould and achieve a gradual increase in force during detachment.

Preferentially, the first part and the second part are separated by a pivot axis, which is an axis that substantially separates the second card body format into two substantially equal parts. The pivot axis demarcates the zone on which the detachment can start.

The residual thickness may be asymmetrical in shape. The residual thickness may be offset in relation to the thickness of the card body.

BRIEF DESCRIPTION OF THE DRAWINGS

The invention will be better understood and other particularities and benefits will become clear in the description below, which refers to the attached drawings, where.

DETAILED DESCRIPTION

Figure 1:
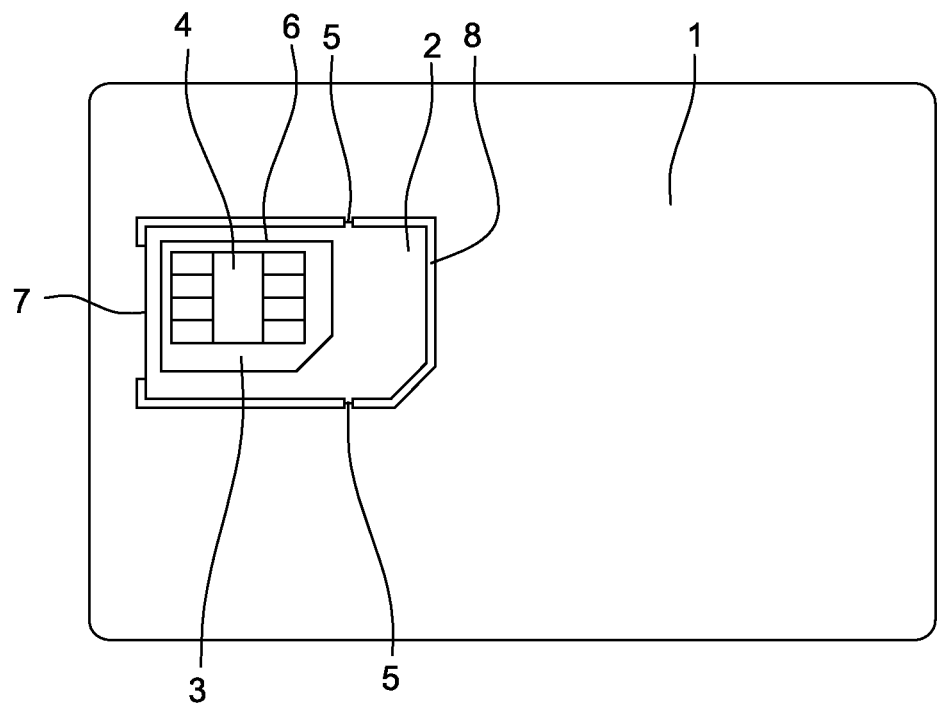
FIG. 1 illustrates a first smart card format embodying the invention.

FIG. 1 represents a smart card with a first card body 1 in the credit card format that supports a second card body 2 in the 2FF format and a third card body 3 in the 3FF format. An electronic module 4 is mounted on the third card body. The electronic module 4 is a conventional module comprising an integrated circuit and a connector supporting six or eight contact pads. The first, second and third card bodies are demarcated by breaking zones 6 and 8. The breaking zones further define the different card bodies and are placed so that the electronic module is positioned on the three card bodies considered independently of each other, in a manner known in the state of the art.

The first card body 1 is separated from the second card body 2 by the first breaking zone 8. This breaking zone is made up of a separating score line, with for example three tabs 5 and 7, the tabs 5 being smaller to break easily and allow pivoting at the start of the break of tab 7, up to the break of that tab 7. The second card body 2 is separated from the third card body 3 by the second breaking zone 6. The second breaking zone is made in accordance with the invention and will be detailed below.

Figure 2:
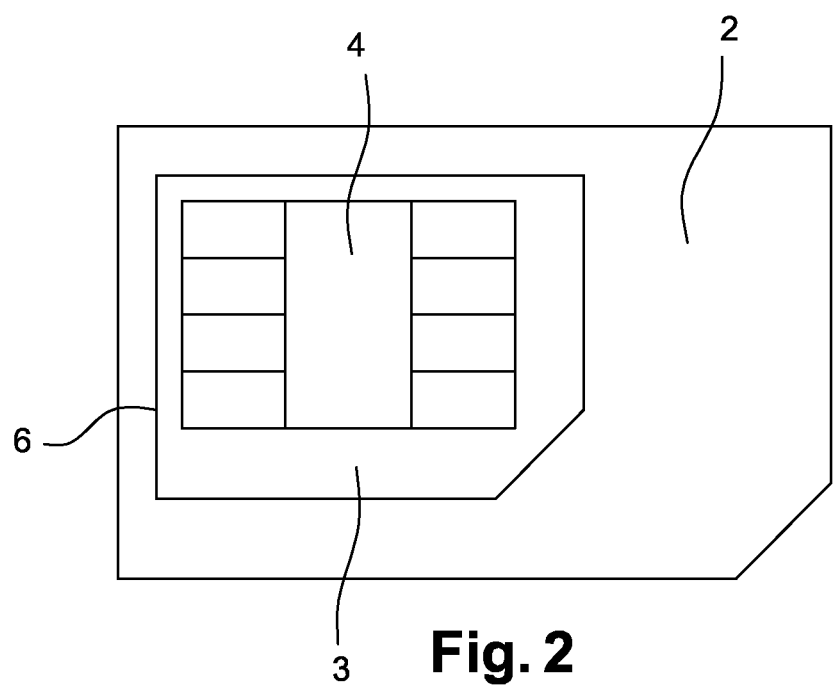
FIG. 2 illustrates a second smart card format embodying the invention.

The card represented in FIG. 1 is a card made and sold in ID-1 format. However, SIM cards can also be made and sold directly in 2FF format as represented in FIG. 2. The card is then only made up of the second card body 2 supporting the third card body 3 separated by the second breaking zone 6. The invention essentially relates to this second breaking zone 6, and in the document below, the card body 1 and the first breaking zone 8 will not be mentioned, even though these two elements may very well be present. The invention could also be used for the first breaking zone 8 even though it is not strictly necessary.

Figure 3:
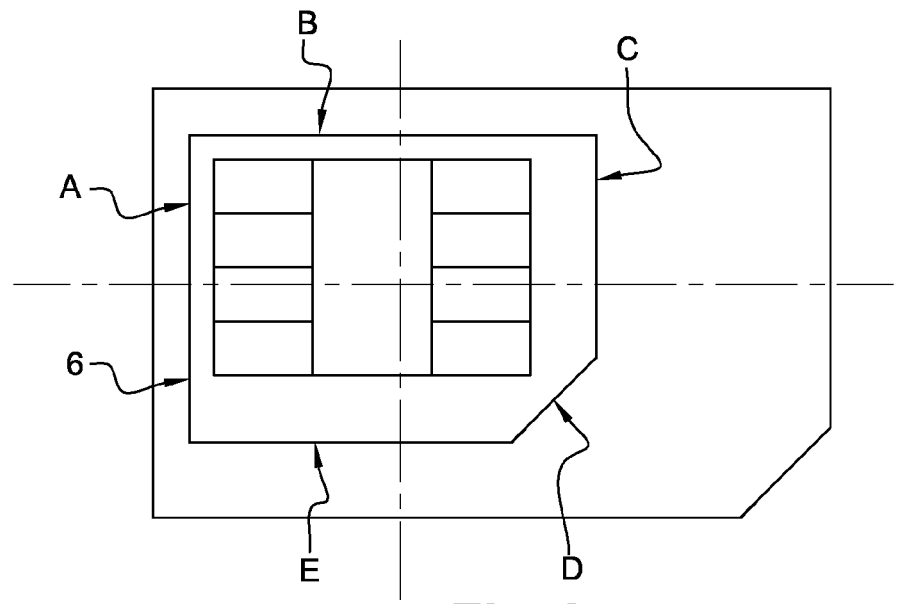
FIGS. 3 and 4 illustrate different details for a better understanding of the invention.
Figure 4:
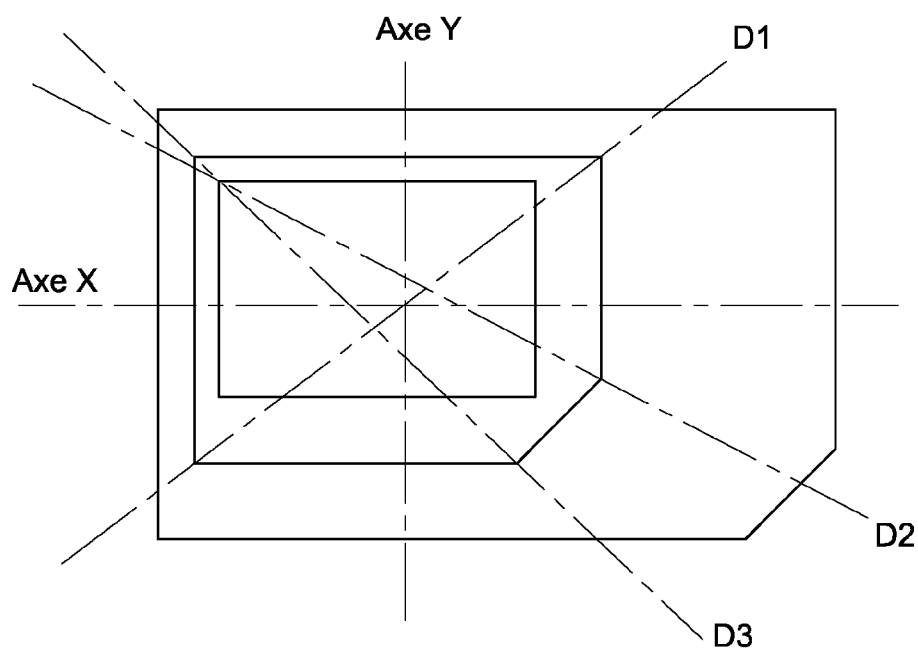

In FIG. 3, it can be seen that the breaking zone 6 is a score line that comprises five sides named A, B, C, D and E for future reference. In FIG. 4, there are five lines that substantially separate the surface of the third card body into two substantially equal parts. The lines X and Y are the median lines of the 3FF format, which pass through the middle of the third card body and are parallel to the edges of the said body. The lines D1, D2 and D3 are straight lines that go through substantially opposite vertices and define two parts with substantially the same area. In that context, substantially equal can mean equal with 10% tolerance, the important feature being that the line divides the card into two parts with a significant surface.

Figure 5:
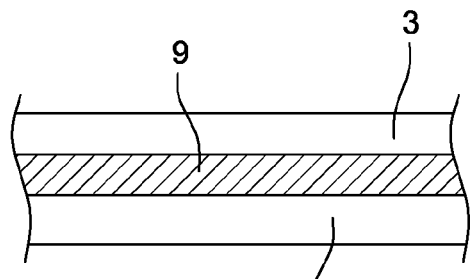
FIGS. 5-7 represent views of sections along a plane going through a score line.
Figure 6:
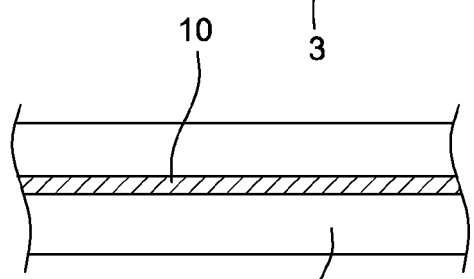

The breaking zone 6 in the invention is made up of a score line where the thickness of the residual matter comprises a first thickness 9 called the large thickness, for example 200 µm, and a second thickness 10 called the small thickness, for example 120 µm. The first thickness 9 illustrated in the section in FIG. 5 ensures proper card holding. The second thickness 10 illustrated in FIG. 6, makes the score easier to detach. Advantageously, any of the lines X, Y, D1, D2 or D3 may be used as the pivot axis with, on one side of the line, the first thickness and on the other side of the line, the second thickness.

For example, if the line Y is considered to be the pivot axis, it is possible to have the first thickness on the side A and the second thickness on the sides C and D. The sides B and E support firstly the first thickness and secondly the second thickness separated by a transition zone. A user who presses the third card body will break the sides C and D fairly easily. If the user does indeed wish to separate the second and third card body, they must keep pressing the third card body, and the sides C and D that are already separated can then act as the start of the break for the sides B and E, then the strongest side A. It is to be noted that once a part of the card is separated, the detaching force can be reduced as shearing is gradual along the score line of the second thickness and not on the totality of the score.

If the pressure applied on the third card body is not deliberate, the sides C and D as they cede indicate to the user that they risk detaching the cards. Fortunately, the stronger sides A, B and E maintain the third card body 3 in the second card body 2.

Thus, a score line is made that can avoid unwanted detaching, at the same time allowing easy separation of the second and third card bodies.

If the line D1 is taken as the pivot axis, the change in thickness will straddle the sides B and C on the one hand and A and E on the other.

Figure 7:
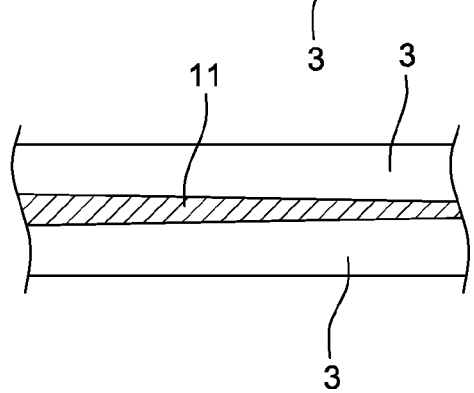

In order to mould the cards, it is preferable to have a gradual transition zone to improve mould removal. The gradual transition zone 11 is represented in FIG. 7. The gradual change in thickness also offers the benefit of gradually increasing the shearing force required as the third card body is freed and therefore as the lever arm offered by the detached part of the third card body increases. That gradual change may be used over the entire length of the side or only on one part of the side, for example 5 mm.

It must be noted that the first and second thicknesses 9 and 10 can vary depending on the surrounded surfaces; thus, the first thickness may for example vary between 100 and 300 µm and the second thickness may for example vary between 30 and 230 µm. These thicknesses may also vary depending on the materials used. Typically, there must be a difference between the first and second thicknesses ranging between 70 and 150 µm.

Figure 8:
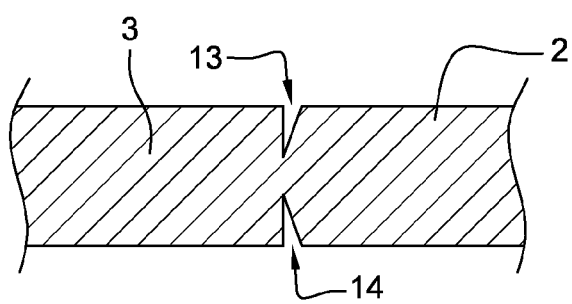
FIGS. 8-9 represent view of sections along a plane perpendicular to a score line
Figure 9:
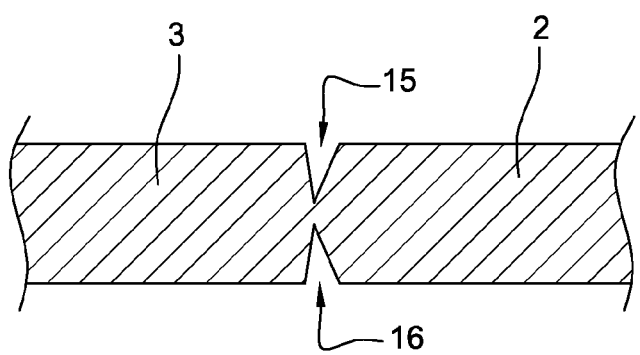

As regards the score profile, reference is made to FIGS. 8 and 9, which show the two types of profile. FIG. 8 represents a so-called half V profile with symmetrical score lines 13 and 14 on each side of the card. The opening of the half V on the surface is proportional with the depth of the score line, while being very much smaller than the depth of that score line.

In FIG. 9, the score line is made with V scores 15 and 16; the opening of these scores is slightly larger than the half V scores but is also very limited. The V opening makes it possible to also allow better mould removal.

Regardless of the profile selected, the opening on the surface depends on the opening angle of the V or half V, which may range from 8° to 45°, and the penetration depth. It is absolutely possible to limit the opening on the surface to 300 µm. With such an opening width, the risk of the contact pads of a reader sticking in the notch when the card is used with the 2FF format is remote.

In terms of embodiment, that score may be achieved by moulding. The mould must be made by taking account of the profile of the score in the invention and moulding is performed normally using a known technique. Of course, the choice of the type of opening will depend on the materials selected for the mould in order to allow better mould removal.

The person of the art will understand that many alternatives using the two thicknesses in the invention are possible. In particular, the use of all the lines indicated is possible and other lines may also be used as pivot axes demarcating the zone with the first thickness and the zone with the second thickness.

Figure 10:
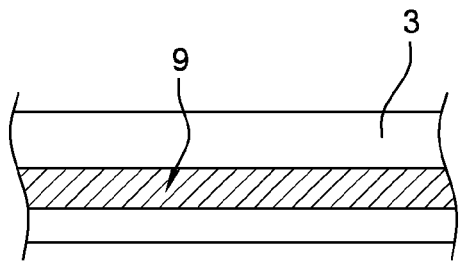
FIGS. 10-14 illustrate alternative embodiments
Figure 11:
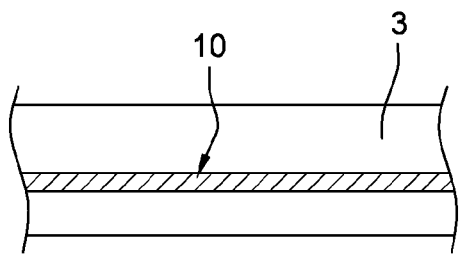
Figure 12:
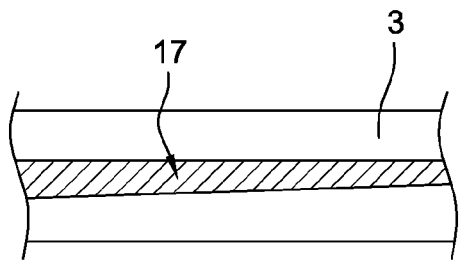

Other alternatives may also be envisaged. For example, symmetrical notches may not be used. The cost of a moulding die with no height variation being lower, asymmetrical score profiles may be used. Thus, the first and second thicknesses 9 and 10 may be offset as represented in FIGS. 10 and 11. A single mould die can handle the thickness variation. Thus the gradual change 17 is also only made on one side, and the other side does not change levels.

Figure 13:
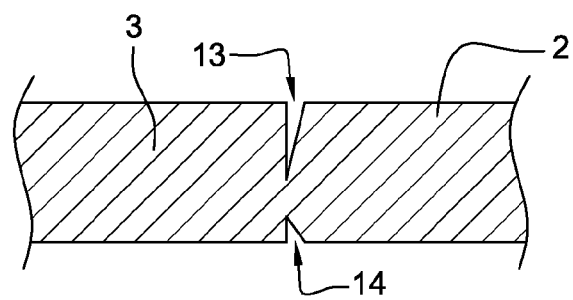
Figure 14:
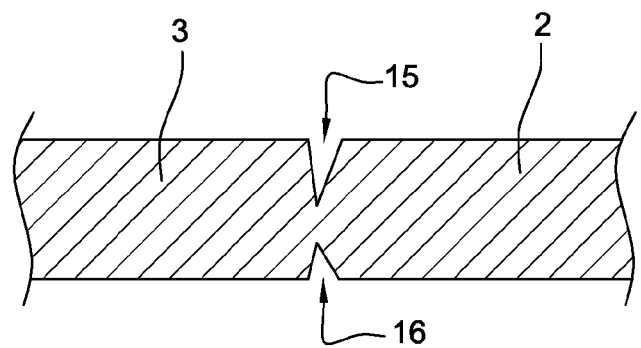

It is also possible to have dissymmetrical scores 13 to 16, as shown in FIGS. 13 and 14, only to provide on one side a score 14 or 16 with a limited and constant opening, for example on the side of the contacts. The residual thickness is then offset in relation to the thickness of the card body. That may further limit the risk of jamming a contact pad.

The invention claimed is:

1. A smart card comprising:
   a first card body in the credit card format that supports a second card body in the 2FF format and a third card body in the 3FF format and an electronic module,
   a score line surrounding the electronic module and defining said 3FF format, the said score line comprising all along the score line a residual matter thickness that is smaller than the thickness of the second card body, the residual matter thickness comprises:
      a first thickness over a first part of the score line, at least a second thickness smaller than the first thickness over a second part of the score line and at least one residual thickness change zone, the said thickness change zone being a gradual thickness change zone that starts with the first thickness and proceeds to the second thickness.

2. A card according to claim 1, wherein the first part and the second part are separated by a pivot axis, which is a line that substantially separates the second card body format into two substantially equal parts.

3. A card according to claim 1, wherein the residual thickness is asymmetrical in shape.

4. A card according to claim 1, wherein the residual thickness is offset in relation to the thickness of the card body.

5. A card according to claim 1, which is made by moulding.

* * * * *